US007579585B2

(12) United States Patent
Hager

(10) Patent No.: US 7,579,585 B2
(45) Date of Patent: Aug. 25, 2009

(54) METHOD AND APPARATUS FOR SCANNING AN ION TRAP MASS SPECTROMETER

(75) Inventor: James W. Hager, Ontario (CA)

(73) Assignees: Sciex Division of MDS Inc., Ontario (CA); Applera Corporation, Framingham, MA (US)

(*) Notice: Subject to any disclaimer, the term of this patent is extended or adjusted under 35 U.S.C. 154(b) by 351 days.

(21) Appl. No.: 11/552,763

(22) Filed: Oct. 25, 2006

(65) Prior Publication Data

US 2007/0114376 A1 May 24, 2007

Related U.S. Application Data

(60) Provisional application No. 60/738,986, filed on Nov. 23, 2005.

(51) Int. Cl.
*H01J 49/40* (2006.01)
*B01D 59/44* (2006.01)

(52) U.S. Cl. ........................ 250/282; 250/287; 250/292

(58) Field of Classification Search ....................... None
See application file for complete search history.

(56) References Cited

U.S. PATENT DOCUMENTS

| | | | | |
|---|---|---|---|---|
| 5,073,713 | A * | 12/1991 | Smith et al. | 250/282 |
| 5,089,703 | A | 2/1992 | Schoen et al. | |
| 5,179,278 | A | 1/1993 | Douglas | |
| 5,248,875 | A | 9/1993 | Douglas et al. | |
| 6,507,019 | B2 | 1/2003 | Chernushevich et al. | |
| 6,621,074 | B1 * | 9/2003 | Vestal | 250/287 |
| 6,700,120 | B2 | 3/2004 | Hager | |
| 6,720,554 | B2 * | 4/2004 | Hager | 250/282 |
| 6,797,950 | B2 | 9/2004 | Schwartz et al. | |
| 6,835,928 | B2 | 12/2004 | Bateman | |
| 2004/0051036 | A1 | 3/2004 | Franzen et al. | |

FOREIGN PATENT DOCUMENTS

CA 2494129 2/2004

OTHER PUBLICATIONS

Written Opinion of the International Searching Authority PCT/CA2005/001704; report dated Dec. 16, 2005.
International Search Report PCT/CA2005/001704; report dated Feb. 10, 2006.

* cited by examiner

*Primary Examiner*—David A. Vanore
(74) *Attorney, Agent, or Firm*—Miller Matthias & Hull

(57) ABSTRACT

A mass spectrometer system having an ion trap and a downstream mass spectrometer is provided. A plurality of groups of ions are provided to the ion trap and a first mass-to-charge ratio is selected. The downstream mass spectrometer is configured to filter out one of (i) ions having a first unselected mass-to-charge ratio different from the first mass-to-charge ratio, and (ii) mass signals for ions having the first unselected mass-to-charge ratio different from the first mass-to-charge ratio. A first group of ions is ejected of the first mass-to-charge ratio from the ion trap to the downstream mass spectrometer.

23 Claims, 6 Drawing Sheets

METHOD AND APPARATUS FOR SCANNING AN ION TRAP MASS SPECTROMETER

RELATED APPLICATIONS

The application claims the benefit of U.S. Provisional Application Ser. No. 60/738,986, filed Nov. 23, 2005, the entire contents of which is hereby incorporated by reference

FIELD

This invention relates to a method and apparatus for scanning an ion trap mass spectrometer.

INTRODUCTION

The performance of ion trap mass spectrometers may deteriorate as the number of trapped ions increases above an optimum range. The result can be broadening of mass spectral features, shifts in apparent m/z, and, in severe cases, ejection of ions at unexpected β-values in the stability diagram. Ion ejection at unexpected a-, q-value combinations can lead to a complete loss of m/z information

SUMMARY

In accordance with an aspect of an embodiment of the present invention, there is provided a method of operating a mass spectrometer system having an ion trap and a downstream mass spectrometer. The method comprises (a) trapping a plurality of groups of ions within the ion trap; (b) selecting a first mass-to-charge ratio; (c) configuring the downstream mass spectrometer to filter out one of (i) ions having a first unselected mass-to-charge ratio different from the first mass-to-charge ratio, and (ii) mass signals for ions having the first unselected mass-to-charge ratio different from the first mass-to-charge ratio; and, (d) ejecting a first group of ions of the first mass-to-charge ratio from the ion trap to the downstream mass spectrometer by scanning the ion trap over a range of ions.

In accordance with a further embodiment of the present invention, there is provided a mass spectrometer system comprising (a) an ion trap for receiving and trapping a plurality of groups of ions; (b) a downstream mass spectrometer for receiving ions ejected from the ion trap; (c) an input means for receiving a selected mass-to-charge ratio; and, (d) a controller for receiving the selected mass-to-charge ratio from the input means and for controlling both the ion trap and the downstream mass spectrometer based on the selected mass-to-charge ratio such that the ion trap is operable to eject a selected group of ions of the selected mass-to-charge ratio from the ion trap by scanning the ion trap over a range of ions, and the downstream mass spectrometer is configured to filter out one of (i) ions having a first unselected mass-to-charge ratio different from the first mass-to-charge ratio, and (ii) mass signals for ions having the first unselected mass-to-charge ratio different from the first mass-to-charge ratio. The controller is linked for communication with the input means, the ion trap and the downstream mass spectrometer.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DESCRIPTION OF VARIOUS ASPECTS

Figure 1:
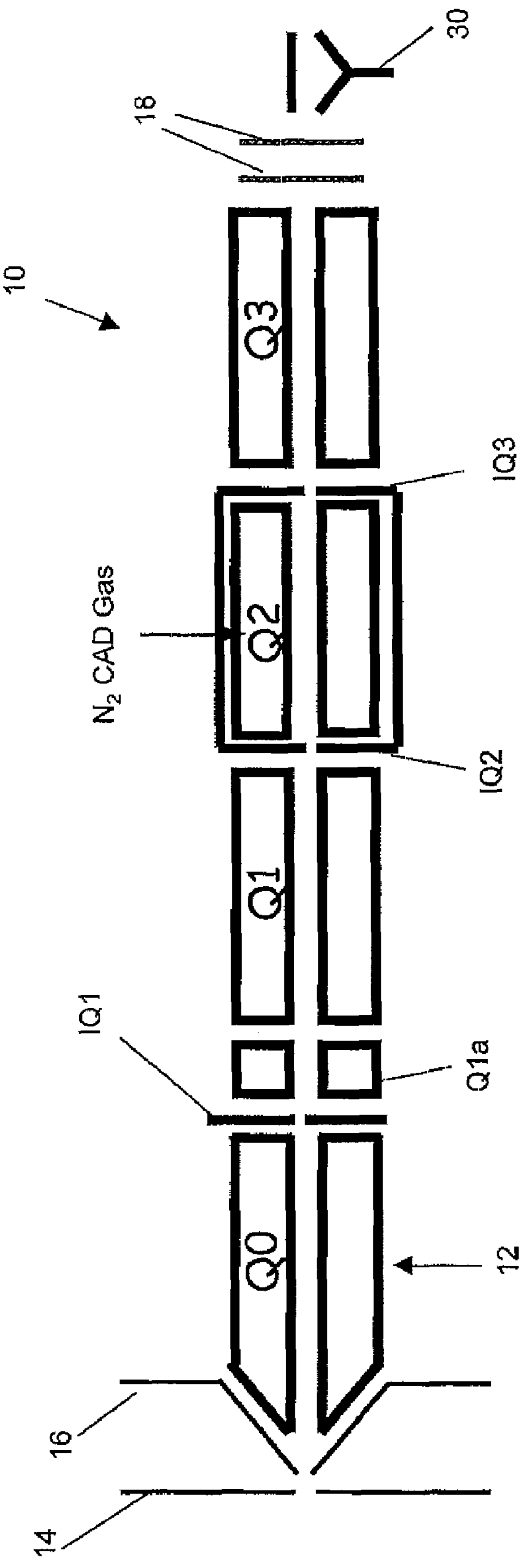
FIG. 1, in a schematic diagram, illustrates a QTRAP Q-q-Q linear ion trap mass spectrometer system in accordance with the prior art.

Referring to FIG. 1, there is illustrated in a schematic diagram, a QTRAP Q-q-Q linear ion trap mass spectrometer system 10, as described by Hager and LeBlanc in Rapid Communications of Mass Spectrometry System 2003, 17, 1056-1064 During operation of the mass spectrometer system, ions can be admitted into a vacuum chamber 12 through an orifice plate 14 and skimmer 16. The linear ion trap mass spectrometer system 10 comprises four elongated sets of rods Q0, Q1, Q2 and Q3, with orifice plates IQ1 after rod set Q0, IQ2 between Q1 and Q2, and IQ3 between Q2 and Q3. An additional set of stubby rods Q1*a* is provided between orifice plate IQ1 and elongated rod set Q1.

In some cases, fringing fields between neighboring pairs of rod sets may distort the flow of ions. Stubby rods Q1*a* are provided between orifice plate IQ1 and elongated rod set Q1 to focus the flow of ions into the elongated rod set Q1.

Ions can be collisionally cooled in Q0, which may be maintained at a pressure of approximately $8\times10^{-3}$ torr Both the linear ion trap mass spectrometer Q1 and the downstream transmission mass spectrometer Q3 are capable of operation as conventional transmission RF/DC multipole mass spectrometers. Q2 is a collision cell in which ions collide with a collision gas to be fragmented into products of lesser mass. Typically, ions may be trapped in the linear ion trap mass spectrometer Q1 using RF voltages applied to the multipole rods, and barrier voltages applied to the end aperture lenses 18.

Many ion trap mass spectrometer systems employ a type of ion gating, which impedes filling the ion trap with too many ions. One possible problem with these ion gating techniques is that they determine the appropriate number of ions with which to fill the ion trap by conducting an extra mass scan. This step requires additional time, and leads to reduced instrument duty cycle, effective scan speed, and overall sensitivity. In accordance with some aspects of some embodiments of the present invention, the downstream transmission mass spectrometer Q3 is operated in conjunction with the linear ion trap Q1 with a mass difference of zero. In other words, the downstream transmission mass spectrometer can be, and in some embodiments is, configured to filter out unselected ions. Ions that are ejected from the linear ion trap Q1 at unexpected a-, q-values can thereby be filtered out and not transmitted by the downstream transmission mass spectrometer Q3.

To provide the mass spectra of FIGS. 2*a*, 2*b*, 3*a* and 3*b*, the mass spectrometer system 10 of FIG. 1 was used Q1 was operated as a linear ion trap with mass selective axial ejection. Collision cell Q2 was operated as a simple ion pipe without collision gas to transfer ions from the linear ion trap Q1 to Q3. Q3 was used as a standard RF/DC resolving multipole mass spectrometer.

Spectra were then acquired for various solutions under space charge conditions with downstream transmission mass spectrometer Q3 sometimes operating in (i) not resolving, RF-only mode, and sometimes in (ii) resolving mode scanning synchronously with the linear ion trap Q1 with a mass difference of 0 amu.

Figure 2A:
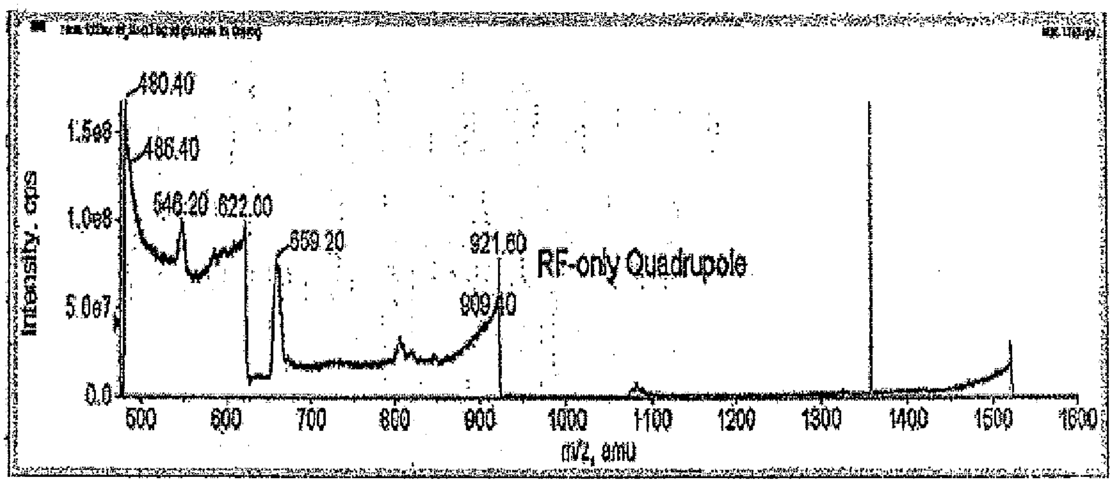
FIG. 2*a* illustrates a mass spectrum for an Agilent test solution containing predominant ions at m/z=622, 922 and 1522, obtained using a linear ion trap.

FIG. 2*a* shows a mass spectrum of an Agilent test solution containing predominant ions at m/z=622, 922 and 1522 obtained by scanning the linear trap Q1 and the downstream transmission mass spectrometer Q3 synchronously with downstream transmission mass spectrometer Q3 not resolving. In other words, linear ion trap Q1 was scanned to sequentially eject ions of m/z 622, 922 and 1522, to ion pipe Q2 and from thence to downstream transmission mass spectrometer Q3 These ejected ions were not resolved in downstream transmission mass spectrometer Q3 and were ejected to detector 30.

The mass spectrum of FIG. 2*a* show severe effects resulting from space charge problems—that is, from the number of trapped ions increasing above an optimum range. As a result, spectral features are considerably broadened in FIG. 2*a*.

Figure 2B:
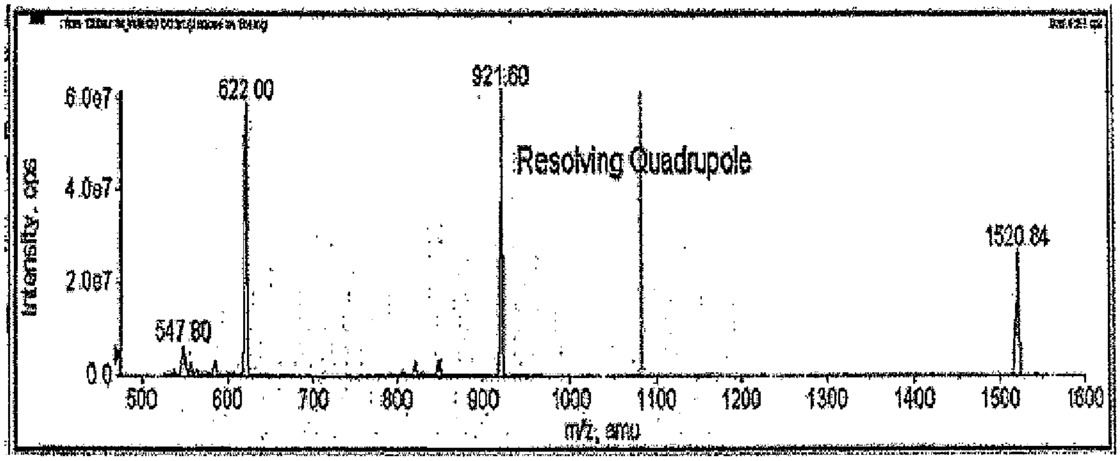
FIG. 2*b* illustrates a mass spectrum of the Agilent test solution containing predominant ions at m/z=622, 922 and 1522, obtained using a linear ion trap together with a downstream transmission mass spectrometer, operating at a mass difference of 0 amu relative to the linear ion trap, in accordance with a first aspect of the present invention.

FIG. 2*b* shows a mass spectrum of the Agilent test solution containing predominant ions at m/z 622, 922 and 1522, obtained by scanning the linear trap Q1 and the downstream transmission mass spectrometer Q3 synchronously with downstream transmission mass spectrometer Q3 in resolving mode with an approximately 3 amu wide transmission window. With the mass spectrum of FIG. 2*b*, space charge problems remain in the linear ion trap Q1. As a result, when ions of a selected mass—say 622—are axially ejected, many other ions of unselected a-, q-values may also be ejected, thereby explaining the broadened mass spectral features of FIG. 2*a*. However, in the case of the mass spectrum of FIG. 2*b*, the ions ejected from the linear ion trap Q1 must first traverse the downstream transmission spectrometer Q3 in resolving mode before reaching ion detector 30 Consequently, many of the mass signals shown in FIG. 2*a*, corresponding to inappropriate a-, q-values for high quality mass spectrum, are filtered out by downstream mass spectrometer Q3, thereby allowing mass spectral information to be recovered. That is, mass signals corresponding to inappropriate a-, q-values will, much of the time, fall outside the 3 amu wide transmission window, and thus be filtered out by Q3 operating in resolving mode.

Figure 3A:
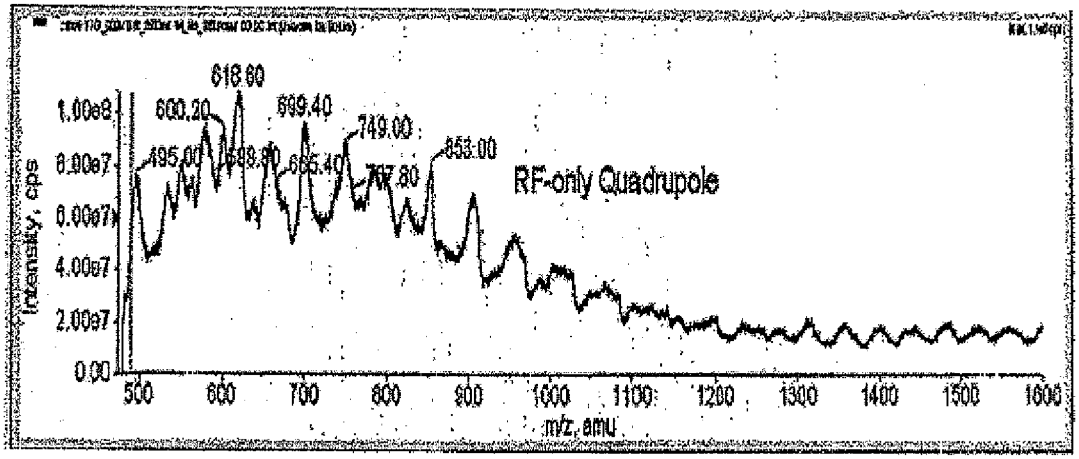
FIG. 3*a* illustrates a mass spectrum for a solution of $Na^+$ adducts of polypropylene glycols obtained using a linear ion trap.

Referring to FIG. 3*a*, a mass spectrum of a solution of $Na^+$ adducts of polypropylene glycols was obtained by scanning the linear trap Q1 and the downstream transmission mass spectrometer Q3 synchronously with downstream transmission mass spectrometer Q3 not resolving. In other words, linear ion trap Q1 was scanned to sequentially eject $Na^+$ adducts of polypropylene glycols to ion pipe Q2 and from thence to downstream transmission mass spectrometer Q3. As with the mass spectrum of FIG. 2*a*, the ejected ions were not resolved in the downstream transmission mass spectrometer Q3 and were ejected to detector 30.

The number of $Na^+$ adducts of polypropylene glycols within the linear ion trap was kept high. Consequently, ions of unselected a-, q-values were ejected from linear ion trap Q1, thereby providing the broadened mass spectral features of FIG. 3*a*.

Figure 3B:
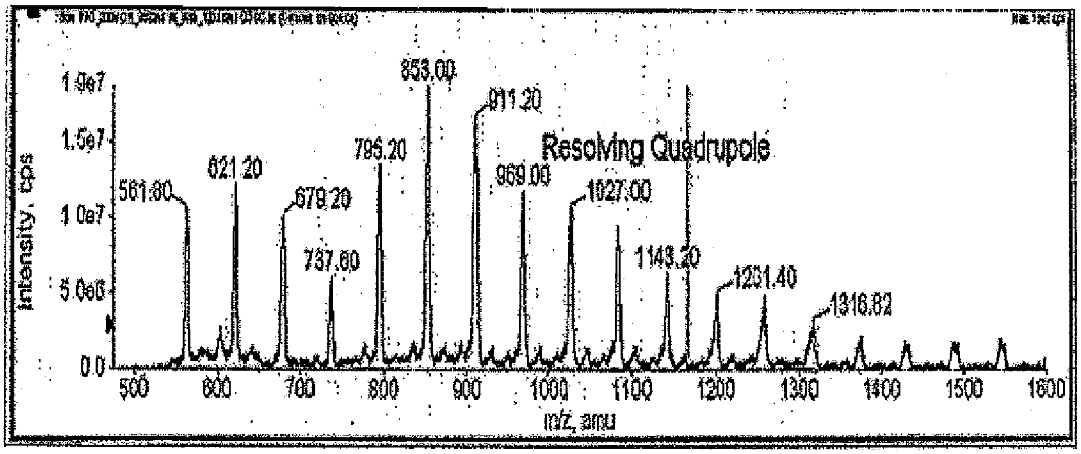
FIG. 3*b* illustrates a mass spectrum for a solution of $Na^+$ adducts of polypropylene glycols obtained using a linear ion trap and a downstream transmission mass spectrometer operating at a mass difference of 0 amu relative to the linear ion trap in accordance with a second aspect of the present invention.

FIG. 3*b* shows a mass spectrum of the $Na^+$ adducts of polypropylene glycols. The mass spectrum of FIG. 3*b* was obtained by scanning linear trap Q1 and the downstream transmission mass spectrometer Q3 synchronously with downstream transmission mass spectrometer Q3 in resolving mode with an approximately 3 amu wide transmission window. The number of $Na^+$ adducts of polypropylene glycols within the linear ion trap Q1 was kept high, such that ions of unselected a-, q-values were ejected from linear ion trap Q1. However, in the case of the mass spectrum of FIG. 3*b*, the ions ejected from the linear ion trap Q1 traversed downstream transmission spectrometer Q3 in resolving mode before reaching the ion detector 30 Consequently, many of the mass signals shown in FIG. 3*a*, corresponding to inappropriate a-, q-values for high quality mass spectrum, were filtered out by downstream mass spectrometer Q3 and are missing from the mass spectrum of FIG. 3*b*. Thus, the mass spectrum of FIG. 3*b* shows a series of resolved peaks separated by 58 amu.

Figure 4:
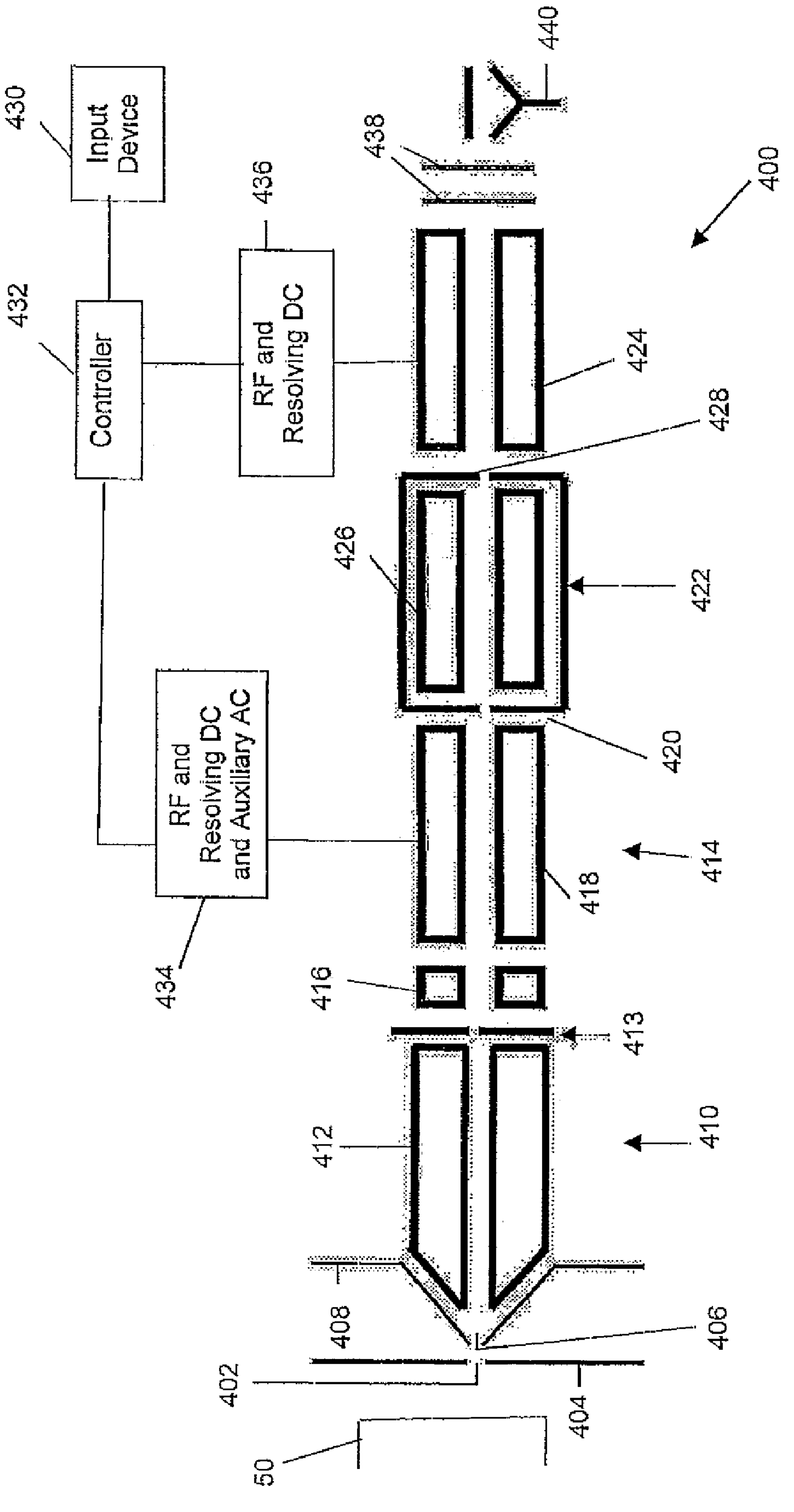
FIG. 4, in a block diagram, illustrates a linear ion trap mass spectrometer system in accordance with an embodiment of the present invention.

Referring to FIG. 4, there is illustrated in a schematic diagram, a linear ion trap mass spectrometer system 400 in accordance with an embodiment of the present invention. In known manner, the system 400 receives ions from an ion source 50, which may, for example, be an electrospray, an ion spray, a corona discharge device or other suitable ion source. Ions from ion source 50 are directed through an aperture 402 in an aperture plate 404. The ions then pass through an aperture 406 in a skimmer plate 408 and into a first chamber 410 Chamber 410 includes a standard RF-only multipole ion guide 412 Its function is to cool and focus the ions, and it is assisted in this function by the relatively high-pressure gas present within chamber 410. Chamber 410 also serves to provide an interface between the atmosphere pressure ion source and a lower pressure vacuum chamber 414, thereby serving to remove more of the gas from the ion stream before further processing An orifice plate 413 separates the chamber 410 from the vacuum chamber 414. In the vacuum chamber 414, short or stubby RF-only rods 416 serve as a Brubaker lens. An elongated rod set 418 is also located in vacuum chamber 414. As elongated multipole rod set 418 is used as a trap, as described in more detail below, chamber 414 is maintained at a pressure of about $5\times10^{-4}$ Torr.

From multipole rod set 418, ions may be axially ejected through orifice plate 420 into collision cell 422. In some embodiments of the invention, collision cell 422 acts simply as an ion pipe without collision gas to transfer ions from multipole rod set 418 to a downstream multipole rod set 424. In other embodiments of the invention, collision cell 422 may be replaced by other intermediate ion optical elements, or can be omitted entirely such that ions from quadrupolar rod set 418 are ejected directly into downstream transmission multipole rod set 424.

In the embodiment shown in FIG. 4, collision cell 422 comprises a multipole rod set 426, which can axially eject ions through orifice plate 428 into multipole rod set 424

In operation, multiple groups of ions, each such group having a different m/z, are supplied by ion source 50 to multipole rod set 418 via orifice plate 404, skimmer 408, vacuum chamber 410 containing rod set 412, orifice plate 413 and stubby rod set 416. Ions can be collisionally cooled in rod set 412, which, as with rod sets Q0 in FIG. 1, may be maintained at a pressure of approximately $8\times10^{-3}$ Torr. Multipole rod set 418 acts as an ion trap for the multiple groups of ions of differing m/z. Then, a first mass-to-charge ratio is selected, either by a user or automatically, and input into input device 430. Input device 430 then communicates the selected first mass-to-charge ratio to controller 432. As shown, a power supply 434 for multipole rod set 418 can provide RF, resolving DC and auxiliary AC to multipole rod set 418. Additionally, power supply 436 can supply RF and resolving DC to downstream transmission rod set 424. The controller 432 can control power supply 436 to configure the RF and resolving DC provided to downstream transmission rod set 424 to filter out ions having a mass-to-charge ratio substantially different from the first mass-to-charge ratio selected and provided to the controller 432 Similarly, the controller 432 controls the power supply 434 to provide RF and resolving DC and auxiliary AC to the multipole rod set 418 operating as a linear ion trap to eject a first group of ions of the first mass-to-charge ratio from the linear ion trap 418 to the downstream mass spectrometer 424, while retaining other ions.

As discussed above, when the number of trapped ions stored in multipole rod set 418 exceeds an optimum range, ions that have a mass-to-charge ratio different from that selected may also be ejected. By linking scanning of the multipole rod set 418 and the downstream transmission multipole rod set 424, with a small transmission window, say about 3 amu, the downstream transmission rod set 424 can be used to filter out these inadvertently ejected ions of unselected mass-to-charge ratios. As shown in FIGS. 2*b* and 3*b*, this can help to recover spectral information that was lost, as the ions of the selected mass-to-charge ratio are not filtered out by rod set 424, but instead are transmitted past exit barrier 438 to detector 440.

Figure 5:
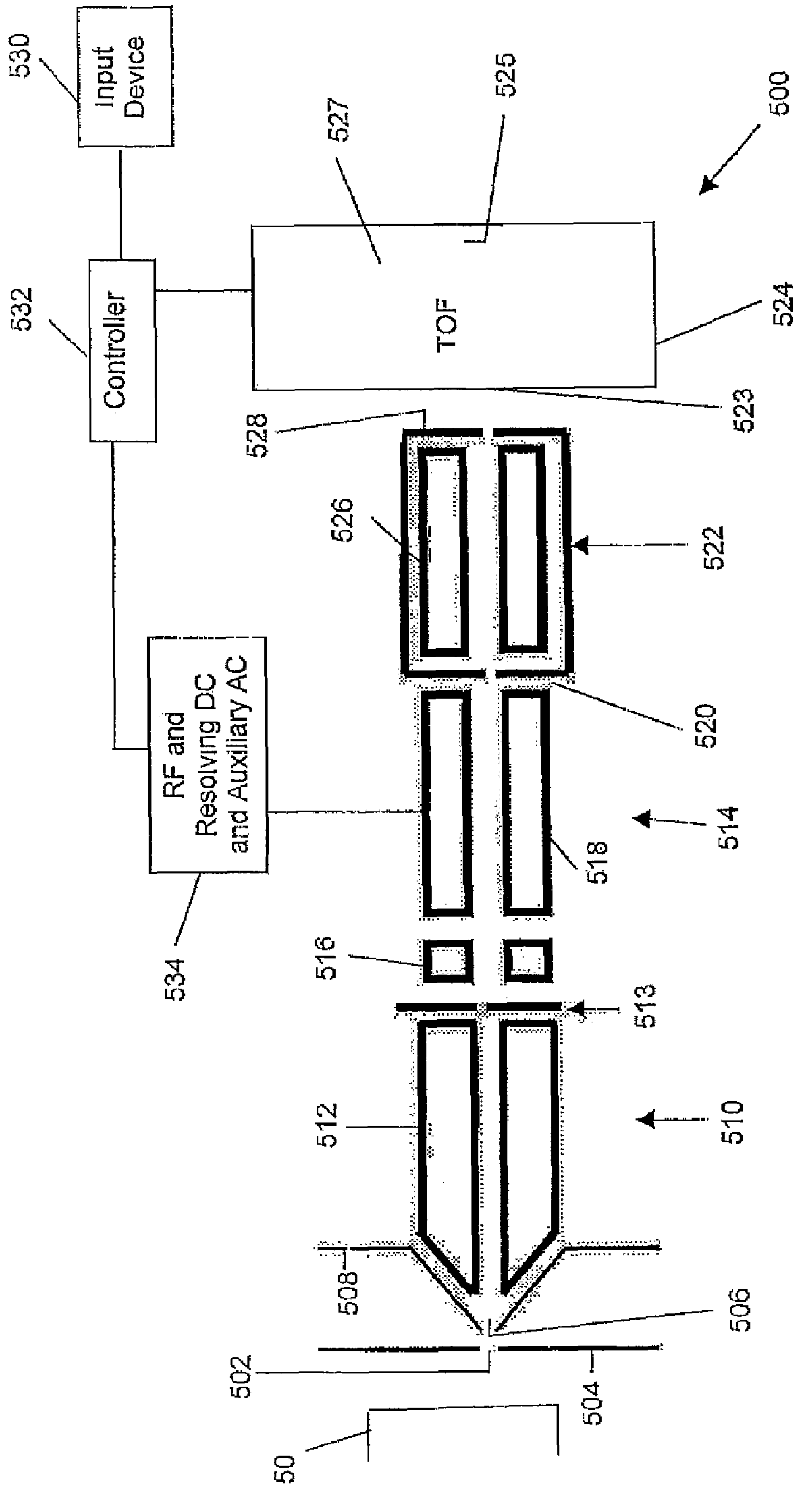
FIG. 5, in a block diagram, illustrates a linear ion trap mass spectrometer system in accordance with a second embodiment of the present invention; and, FIG. 6, in a flowchart, illustrates a method in accordance with an aspect of an embodiment of the present invention.

Referring to FIG. 5, there is illustrated in a schematic diagram, a linear ion trap mass spectrometer system 500 that uses a downstream time-of-flight (TOF) mass spectrometer 524 in accordance with a second embodiment of the present invention. For clarity, the same reference numerals, together with 100 added, are used to designate elements of the linear ion trap mass spectrometer system 500 analogous to elements of the system 400 of FIG. 4. For brevity, the description of FIG. 4 will not be repeated with respect to FIG. 5.

In operation, multiple groups of ions, each such group having a different m/z, are supplied by ion source 50 to multipole rod set 518 via orifice plate 504, skimmer plate 508, vacuum chamber 510, orifice plate 513 and stubby rod set 516. Then, a first mass-to-charge ratio is selected either by a user or automatically, and input into input device 530. Input device 530 then communicates the selected first mass-to-charge ratio to controller 532. As shown, and similar to system 400, a power supply 534 for multipole rod set 518 can provide RF, resolving DC and auxiliary AC to multipole rod set 518.

Figure 6:
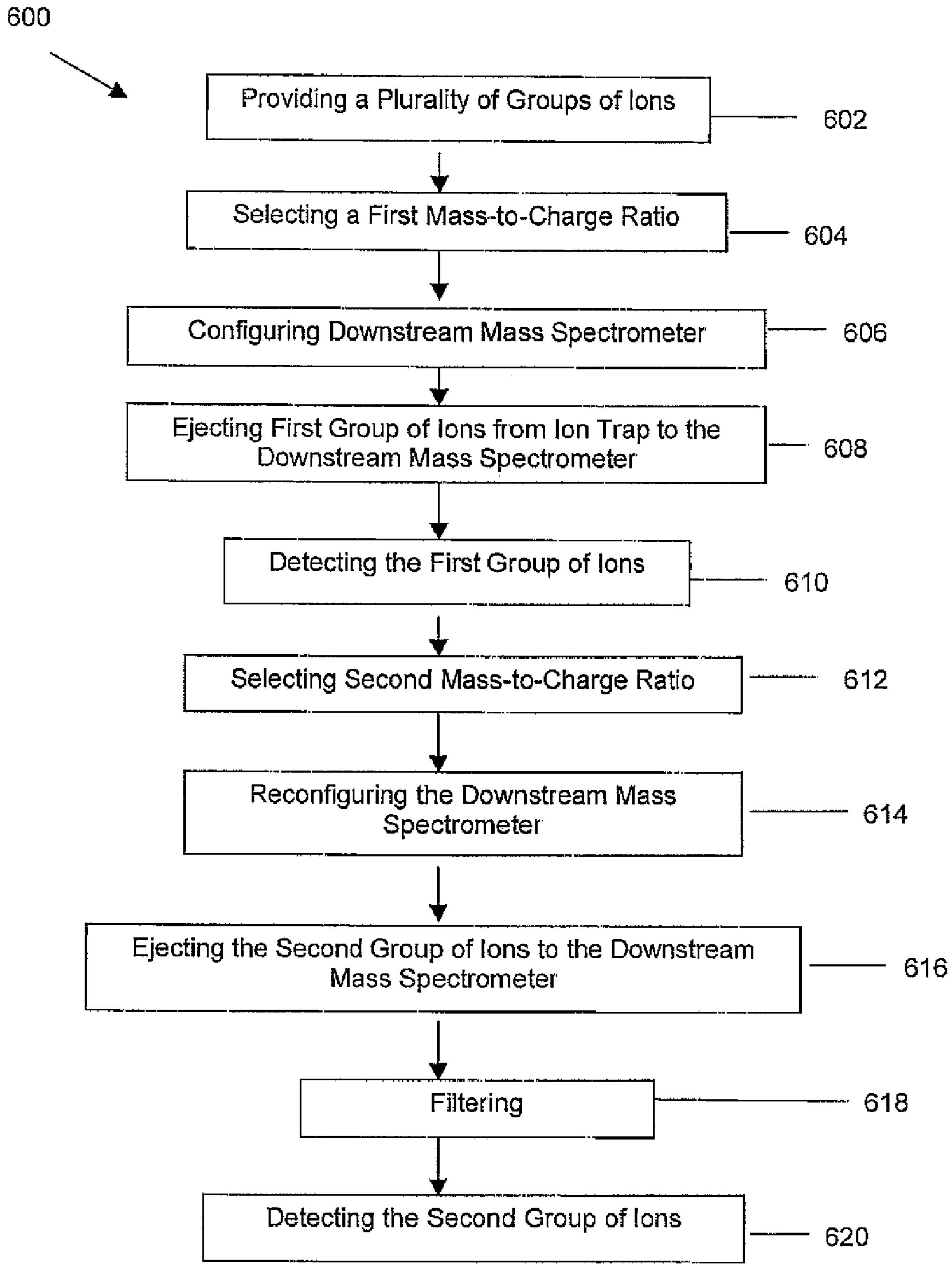

The controller 532 controls power supply 534 to configure multipole rod set 518 to eject a group of ions having a first mass-to-charge ratio. However, as discussed above, when the number of trapped ions stored in multipole rod set 518 exceeds an optimum range, ions that have a mass-to-charge ratio different from that selected may also be ejected. All of these ions are ejected from multipole rod set 518 and from downstream collision cell 522 or other intermediate ion optical elements, at a known time, such that the ions enter an inlet aperture 523 of time-of-flight mass spectrometer 524 at a known time. Within the time-of-flight mass spectrometer 524, all of the ions are subjected to the same electrical field, and are allowed to drift in a region of constant electrical energy. As a result, the ions will traverse this drift region in a time and arrive at a detector 525 in a time window that depends upon their m/z ratios. In some embodiments, controller 532 can control the detector 525 of time-of-flight mass spectrometer 524 to detect only those ions that traverse the drift zone 527 of the time-of-flight mass spectrometer 524 in an amount of time that ions of the first selected m/z will take. Alternatively, the detector 525 may detect both the selected and unselected ions. A time window for the selected ions to reach the detector 525 would also be determined. Then, all of the signals received outside of this time window, which would typically correspond to ions of unselected m/z being detected by detector 525, would be filtered out Referring to FIG. 6, there is illustrated in a flow chart, a method of scanning an ion trap mass spectrometer system in accordance with an aspect of an embodiment of the present invention. Either of the mass spectrometer systems of FIGS. 4 and 5 could be used, or, alternatively, other mass spectrometer systems may also be used, provided that such mass spectrometer systems comprise an upstream ion trap and a downstream mass spectrometer. In step 602, multiple groups of ions can be provided by an ion source to the upstream linear ion trap. Each of these groups of ions corresponds to a different m/z Then, in step 604, a first mass-to-charge ratio, corresponding to one of the groups of ions stored in the linear ion trap, is selected. In step 606, the downstream mass spectrometer is configured to filter out ions having a mass to charge ratio different from the first mass-to-charge ratio. Typically, some range or window will be permitted, such that ions within a certain range, of, say, 3 amu will not be filtered out, but ions outside of this range will be filtered out. Of course, this window may be adjusted depending on the m/z of other groups of ions. In step 608, a first group of ions of the first mass-to-charge ratio is ejected from the linear ion trap to the downstream mass spectrometer. As described above, if a number of trapped ions stored in the linear ion trap exceeds an optimum number, then ions that have a mass-to-charge ratio different from that selected are also likely to be ejected. Both the selected and unselected ions are then provided to the downstream mass spectrometer.

The operation of the downstream mass spectrometer in filtering out ions of unselected mass-to-charge ratio will differ depending upon the type of system used. For example, if the downstream mass spectrometer is a quadrupole mass spectrometer, or other multipole mass spectrometer that physically filters out the unselected ions (generally referred to as an ion guide), then, in step 608, suitable RF and DC drive voltages are provided to the downstream ion guide to radially confine and transmit the first group of ions while filtering out ions having an unselected mass-to-charge ratio. The first group of ions would then be detected in step 610. On the other hand, if the downstream mass spectrometer is, for example, a time-of-flight mass spectrometer, then step 608 would involve determining an amount of time it takes for the first group of ions to traverse a drift zone of the time-of-flight mass spectrometer to reach the detector. Then, mass signals from the detector that are received within a certain time window, corresponding to the amount of time it takes for the first group of ions to traverse the drift zone along with a margin of variation, would be accepted, while mass signals from the detector that are received outside this time window would be filtered out.

Other variations and modifications of the invention are possible. For example, while in the foregoing description, reference is made to a linear ion trap, it will be appreciated that ion traps other than linear ion traps may be used. In particular, space charge problems may be even more likely to arise in ion traps other than linear ion traps. Accordingly, aspects of the present invention may also be applied to ion traps other than linear ion traps. Further, mass spectrometers or ion guides other than quadrupole mass spectrometers can be used to provide space-based ion separation. For example, mass spectrometers having more than four rods may be used. All such modifications or variations are believed to be within the sphere and scope of the invention as defined by the claims.

The invention claimed is:

1. A method of operating a mass spectrometer system having an ion trap and a downstream mass spectrometer, the method comprising:

(a) trapping a plurality of groups of ions within the ion trap;

(b) selecting a first mass-to-charge ratio;

(c) configuring the downstream mass spectrometer to filter out one of (i) ions having a first unselected mass-to-charge ratio different from the first mass-to-charge ratio, and (ii) mass signals for ions having the first unselected mass-to-charge ratio different from the first mass-to-charge ratio; and, (d) ejecting a first group of ions of the first mass-to-charge ratio from the ion trap to the downstream mass spectrometer by scanning the ion trap over a range of ions.

2. The method as defined in claim 1 wherein the downstream mass spectrometer is an ion guide for filtering out ions having the first unselected mass-to-charge ratio different from the first mass-to-charge ratio; and, step (c) comprises providing a first RF and DC drive voltages to the ion guide to radially confine and transmit the first group of ions and to filter out ions having the first unselected mass-to-charge ratio.

3. The method as defined in claim 2 further comprising, after step (d), ejecting the first group of ions from the ion guide to a detector, and detecting the first group of ions at the detector.

4. The method as defined in claim 1 further comprising, selecting a second mass-to-charge ratio different from the first mass-to-charge ratio;

after step (c), reconfiguring the downstream mass spectrometer to filter out ions having a second unselected mass-to-charge ratio different from the second mass-to-charge ratio; and, ejecting a second group of ions of the second mass-to-charge ratio from the ion trap to the downstream mass spectrometer.

5. The method as defined in claim 4 wherein the downstream mass spectrometer is an ion guide for filtering out ions having the first unselected mass-to-charge ratio different from the first mass-to-charge ratio; and, step (c) comprises providing a first RF and DC drive voltages to the ion guide to radially confine and transmit the first group of ions and to filter out ions having the first unselected mass-to-charge ratio;

the step of reconfiguring the ion guide to filter out ions having the second unselected mass-to-charge ratio comprises providing a second RF and DC drive voltages different from the first RF and DC drive voltages to the ion guide to radially confine and transmit the second group of ions and to filter out ions having the second unselected mass-to-charge ratio.

6. The method as defined in claim 5 further comprising, after step (d), ejecting the first group of ions from the ion guide to a detector, and detecting the first group of ions at the detector; and, after transmitting the second group of ions through the ion guide, ejecting the second group of ions from the ion guide to a detector, and detecting the second group of ions at the detector.

7. The method as defined in claim 4 wherein the downstream mass spectrometer is a TOF mass spectrometer and comprises a detector;

step (c) comprises (i) determining a first flight time range for the first group of ions to traverse a drift zone of the TOF mass spectrometer to reach the detector, (ii) accepting mass signals from the detector received within the first flight time range, and (iii) filtering out ions having the first unselected mass-to-charge ratio by rejecting mass signals from the detector received outside the first flight time range; and, the step of reconfiguring the downstream mass spectrometer to transmit the second group of ions comprises (i) determining a second flight time range for the second group of ions to traverse the drift zone of the TOF mass spectrometer to reach the detector, (ii) accepting mass signals from the detector received within the second flight time range, and (iii) filtering out ions having the second unselected mass-to-charge ratio by rejecting mass signals from the detector received outside the second flight time range.

8. The method as defined in claim 4 further comprising filtering out one of (i) ions having the first unselected mass-to-charge ratio from the first group of ions in the downstream mass spectrometer, and (ii) mass signals for ions having the first unselected mass-to-charge ratio from mass signals for the first group of ions in the downstream mass spectrometer; and, filtering out one of (i) ions having the second unselected mass-to-charge ratio from the second group of ions in the downstream mass spectrometer, and (ii) mass signals for ions having the second unselected mass-to-charge ratio from mass signals for the second group of ions in the downstream mass spectrometer.

9. The method as defined in claim 1 wherein the downstream mass spectrometer is a TOF mass spectrometer and comprises a detector; and, step (c) comprises (i) determining a first flight time range for the first group of ions to traverse a drift zone of the TOF mass spectrometer to reach the detector, (ii) accepting mass signals from the detector received within the first flight time range, and (iii) filtering out ions having the first unselected mass-to-charge ratio by rejecting mass signals from the detector received outside the first flight time range.

10. The method as defined in claim 1 wherein the mass spectrometer system further comprises at least one intermediate ion optical element located between the ion trap and the downstream mass spectrometer; and, step (d) comprises ejecting the first group of ions to the at least one intermediate ion element, confining the first group of ions within the at least one intermediate ion optical element and transmitting the first group of ions from the at least one intermediate ion optical element to the downstream mass spectrometer.

11. The method as defined in claim 1 further comprising filtering out one of (i) ions having the first unselected mass-to-charge ratio from the first group of ions in the downstream mass spectrometer, and (ii) mass signals for ions having the first unselected mass-to-charge ratio from mass signals for the first group of ions in the downstream mass spectrometer.

12. The method as defined in claim 1 wherein the downstream mass spectrometer is an ion guide for filtering out ions having the first unselected mass-to-charge ratio different from the first mass-to-charge ratio; and, step (c) comprises providing a mass transmission window to resolve ions having the first mass-to-charge ratio, and scanning the ion guide synchronously with the ion trap by scanning the mass transmission window, wherein the mass transmission window is operable to filter out ions having mass-to-charge ratios outside a range of the mass transmission window, and the ions having mass-to-charge ratios outside the range of the mass transmission window include the ions having the first unselected mass-to-charge ratio, and the first mass-to-charge ratio is inside the range of the mass transmission window.

13. The method as defined is claim 12 wherein the ion trap and the ion guide are scanned synchronously with a zero mass difference.

14. The method as defined in claim 12 wherein the mass transmission window has a width of between 2 atomic mass units and 5 atomic mass units.

15. The method as defined in claim 1 wherein the ion trap and the downstream mass spectrometer are operated in tandem with a zero mass difference.

16. The method as defined in claim 1 further comprising ejecting at least some ions having the first unselected mass-to-charge ratio to the downstream mass spectrometer by scanning the ion trap, wherein the ions having the first unselected mass-to-charge ratio are ejected at unselected a- and q-values.

17. A mass spectrometer system comprising an ion trap for receiving and trapping a plurality of groups of ions;

a downstream mass spectrometer for receiving ions ejected from the ion trap;

an input means for receiving a selected mass-to-charge ratio; and, a controller for receiving the selected mass-to-charge ratio from the input means and for controlling both the ion trap and the downstream mass spectrometer based on the selected mass-to-charge ratio such that the ion trap is operable to eject a selected group of ions of the selected mass-to-charge ratio from the ion trap by scanning the ion trap over a range of ions; and, the downstream mass spectrometer is configured to filter out one of (i) ions having a first unselected mass-to-charge ratio different from the first mass-to-charge ratio, and (ii) mass signals for ions having the first unselected mass-to-charge ratio different from the first mass-to-charge ratio;

wherein the controller is linked for communication with the input means, the ion trap and the downstream mass spectrometer.

18. The mass spectrometer system as defined in claim 17 wherein the downstream mass spectrometer is an ion guide for filtering out ions having the first unselected mass-to-charge ratio different from the first mass-to-charge ratio; and, the controller is operable to control the ion guide based on the selected mass-to-charge ratio such that a corresponding RF and DC drive voltages are provided to the ion guide to radially confine and transmit the selected group of ions and to filter out ions having the unselected mass-to-charge ratio.

19. The mass spectrometer system as defined in claim 18 further comprising a detector for receiving and detecting the selected group of ions, wherein the ion guide is operable to eject the selected group of ions from the ion guide to the detector.

20. The mass spectrometer system as defined in claim 17 wherein the downstream mass spectrometer is a TOF mass spectrometer and comprises a detector; and, the controller is operable to control the TOF mass spectrometer based on the selected mass-to-charge ratio such that the TOF mass spectrometer is operable to (i) determine a corresponding flight time range for the selected group of ions to traverse a drift zone of the TOF mass spectrometer to reach the detector, (ii) accept mass signals from the detector received within the corresponding flight time range, and (iii) filter out ions having the unselected mass-to-charge ratio by rejecting mass signals from the detector received outside the corresponding flight time range.

21. The mass spectrometer system as defined in claim 17 further comprising at least one intermediate ion optical element for receiving the selected group of ions from the ion trap and for transmitting the selected group of ions to the downstream mass spectrometer.

22. The mass spectrometer system as defined in claim 17 wherein the ion trap is a linear ion trap.

23. The mass spectrometer system as defined in claim 17 wherein the downstream mass spectrometer is an ion guide for filtering out ions having the first unselected mass-to-charge ratio different from the first mass-to-charge ratio; and, the controller is operable to control the ion guide to resolve ions having the mass-to-charge ratio using a mass transmission window, and to scan the ion guide synchronously with the ion trap by scanning the mass transmission window, wherein the mass transmission window is operable to filter out ions having mass-to-charge ratios outside a range of the mass transmission window, and the ions having mass-to-charge ratios outside the range of the mass transmission window include the ions having the first unselected mass-to-charge ratio, and the selected mass-to-charge ratio is inside the range of the mass transmission window.

* * * * *